United States Patent Office 3,219,305
Patented Nov. 23, 1965

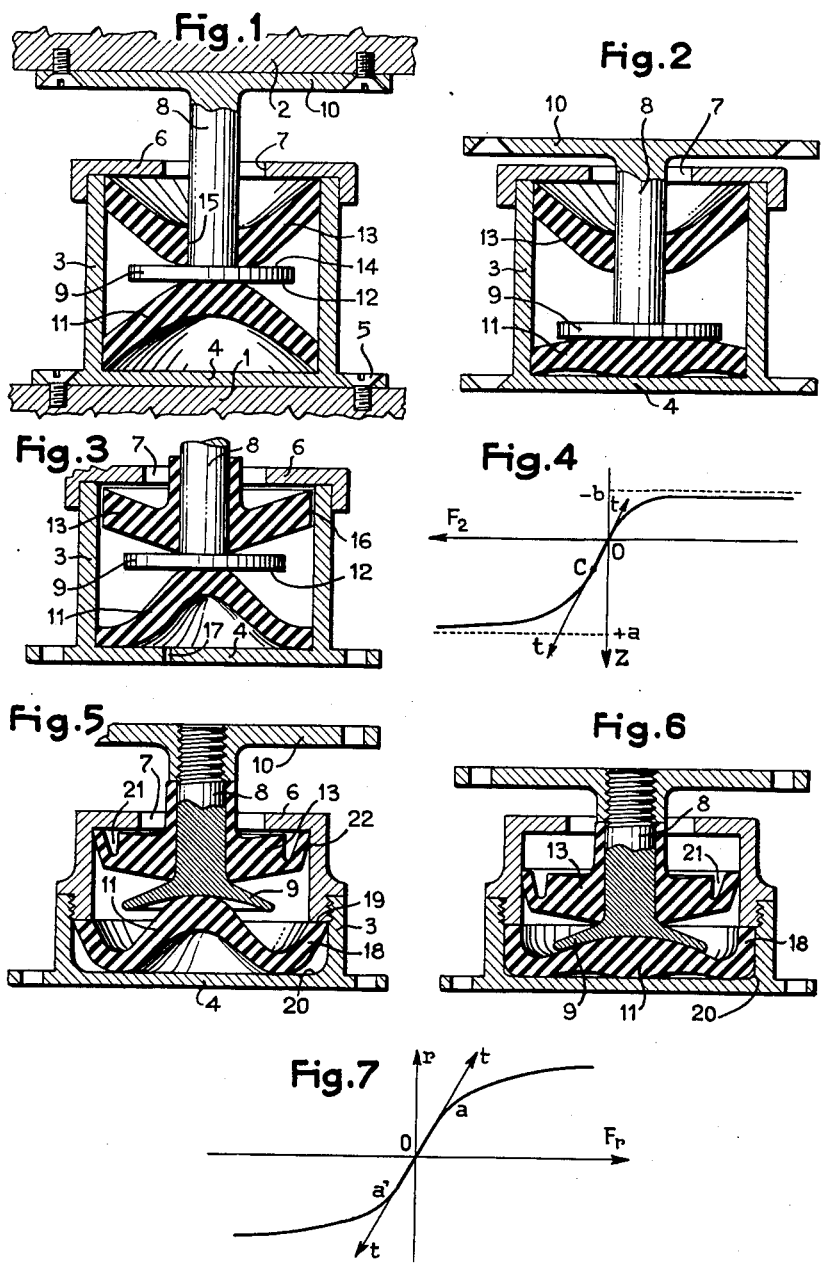

3,219,305
SHOCK AND VIBRATION DAMPER
André Chartet, Meudon (Seine-et-Oise), France, assignor to P.C.C., Meudon (Seine-et-Oise), France, a corporation of France
Filed July 13, 1962, Ser. No. 209,707
Claims priority, application France, July 17, 1961, 868,106
20 Claims. (Cl. 248—358)

A number of devices for absorbing or damping shocks and vibrations are known. However, these devices have certain operational limitations. In some of them their flexibility is sufficient for suitably damping vibrations but in the case of extremely violent shocks either the elastic element they contain is impaired or the travel of the damper is more or less suddenly limited by a mechanical abutment, if such abutment has been provided. Other known devices have on the contrary very great resistance to shocks but they are so rigid that they are more or less ineffective as concerns damping vibrations.

The object of the present invention is to provide improvements in shock and vibration dampers which render them capable of damping or absorbing extremely violent shocks with all the desired progressivity and without damage to the apparatus they protect or to themselves which they possess in their normal operational position under the permanent load that they might support, sufficient flexibility for constituting an effective filter against the transmission of vibrations.

The invention resides mainly in constituting a shock and vibration damper or absorber intended to be interposed between two structures by a piston enclosed in a preferably cylindrical cavity connected to one of the structures, the rod of the piston being fixed to the other structure, the lower face of the piston bearing on a membrane composed of a material having a rubber-like elasticity and termed a "carrying membrane" which bears on the end of the cavity, a second membrane termed "opposing membrane" which is also of a material having a rubber-like elasticity and is interposed between the upper face of the piston and the upper part of the cavity whereby the downward movements of the piston from its central position results in deformation of the carrying membrane by bending or by compression or by both simultaneously, and the upward movements of the piston from said central position result in deformation of the opposing membrane by bending or compression or by both simultaneously.

In addition to this main arrangement the invention also comprises other arrangements used alone or combinations thereof and which will appear from the ensuing description; among such arrangements can be mentioned the following:

A certain number of these arrangements relate to manner in which the membranes work, whether it concerns the carrying membrane or the opposing membrane or both these membranes simultaneously. In one arrangement the membrane in question is so disposed that under the effect of high compressive force exerted by the piston on said membrane the latter bears, at the end of the travel, flat against the adjacent wall of the cavity and is compressed in its thickness between the piston and said wall on at least a part of its surface. Such an arrangement enables said membrane to resist forces which could reach very high values at the end of travel while it has such shape and is composed of such material that it has the desired flexibility in respect of deformations of smaller amplitude. This arrangement can furthermore result in a progressive abutment effect when the conjugate profiles or shapes of the membrane, of the surface of the piston and of the adjacent end wall of the cavity are such that the surfaces on which the membrane bears on the piston and on the end of the cavity increase when the compressive force increases up to a high value. Another arrangement is to increase the flexibility of the device under load so as to obtain optimum filtering of the small oscillations about the position under load. It consists in disposing the opposing membrane in such manner that it works only under compression when a tractive force is exerted on the piston and that it does not work under extension upon application of a compressive force on said piston. This result could be obtained either by permitting the opposing membrane to slide freely along the rod of the piston or by permitting the opposing membrane to slide at its periphery along the lateral walls of the cavity or by these two means employed simultaneously. Similarly it could also be advantageous to dispose the carrying membrane in such manner that it is subjected only to compressive forces and no tractive force. To this end, the piston could simply bear on the carrying membrane without a positive connection with said membrane or the periphery of the carrying membrane could freely slide against the lateral walls of the cavity, these two solutions being adopted separately or simultaneously.

Other arrangements concern the damping of shocks and vibrations in directions in space other than the axial direction of the device. One arrangement comprises forming between the rod of the piston and the aperture through which this rod extends in the upper wall of the cavity sufficient clearance of about several millimetres so as to permit movement of the piston relative to the cavity in a direction perpendicular to its axis, a clearance of the same order being of course also provided between the periphery of the piston and the adjacent lateral walls of the cavity. An arrangement complementary to the foregoing arrangement consists in disposing the opposing membrane or the carrying membrane or both membranes simultaneously in such manner that any radial displacement of the piston (namely displacement perpendicular to its axis) results in an elastic deformation of the considered membrane and consequently an elastic force returning the piston to its central position. If the piston bears simply on the carrying membrane, the opposing membrane would then be employed for this transverse return and it could be advantageous to give said opposing membrane such thickness as to permit it to elastically resist high lateral forces. In this case an arrangement already described and contemplating a possibility of sliding of the opposing membrane relative to the piston or relative to the lateral walls of the cavity, is advantageously employed to insure that the rigidity of the opposing membrane does not stiffen the device as concerns axial oscillations about the position under load.

Further arrangements concern the particular shapes of the membranes. In one arrangement the carrying membrane is bell-shaped and its periphery at the base of the bell bears against the adjacent end wall of the cavity while the apex of the bell supports the force transmitted by the piston. Under these conditions any compressive force exerted on the apex of the membrane by the piston tends to flatten said membrane and expand it radially at its base, thereby causing a rubbing against the end wall of the cavity and consequently a damping of the axial oscillations. An additional damping can be obtained in this case by the suction effect occurring in this arrangement. When compressing the bell-shaped membrane, the air enclosed between the latter and the end wall of the cavity tends to escape under pressure as the piston descends, and in the course of the rise of the latter the re-entry of air into the membrane is braked so that a suction is created in the space defined by the membrane and the end wall of the cavity. In this case it is advantageous to slightly lubricate, for example by means of a silicon oil, the bearing surface of the membrane and the adjacent face of the end of the cavity so as to obtain more even rubbing conditions. An arrangement complementary to the preceding arrangement consists in giving to the carrying membrane a bell shape such as indicated hereinbefore and in extending it at its periphery, beyond the part which bears against the end wall of the cavity, by a skirt bearing against the lateral walls of the cavity. Further, a special arrangement could be adopted preferably in respect of the opposing membrane so as to increase its radial elasticity for small radial displacements while it possesses a thickness which imparts thereto great resistance to large axial or radial forces. This last-mentioned arrangement consists in giving to said membrane the shape of a thick disc having in the vicinity of its periphery a deep annular groove so that said membrane bears on the lateral inner face of the cavity through the medium of a relatively thin, and consequently flexible, lip. Under the effect of a lateral displacement of the piston this lip tends to close in the zone in which it radially bears against the cavity and therefore provides a progressive abutment effect in respect of forces perpendicular to the axis of the device (radial forces).

The ensuing description will give a better understanding of the features and advantages of the invention. This description is illustrated by the accompanying drawing, it being emphasized that this description and drawing are given merely by way of example and that the scope of the invention is not intended to be limited thereto. As the various embodiments of the invention shown in this drawing are bodies of revolution about an axis, axial sectional views thereof to the exclusion of any plan view are believed to be sufficient for defining the essential features of the invention.

Further, in the ensuing description it is assumed that the damper is vertical and supports a permanent compressive load or static load, it being understood that the invention also embraces any damper comprising elements similar to those that will be described but adapted to work under a static load or under a permanent tractive force or horizontally or obliquely.

FIG. 1 is an axial sectional view of an embodiment of the invention, the damper being under no load and FIG. 2 is a sectional view of the same embodiment of the invention, the damper being compressed to the maximum extent;

FIG. 3 is an axial sectional view of an assembly comprising a specific embodiment of the carrying membrane and the opposing membrane;

FIG. 4 is a diagram showing the general form of the law of the variation in the axial elastic reaction of a damper according to the invention under the effect of an upward or downward axial displacement of the piston;

FIG. 5 is an axial sectional view of a preferred embodiment of the invention, the damper being under no load, and FIG. 6 is a similar view of the same damper when it is compressed to the maximum extent, this view showing the positions and shapes adopted by the membranes, and FIG. 7 is a diagram showing the general shape of the law of the variation in the radial elastic reaction of a damper according to the invention.

The damper or shock absorber shown in FIG. 1 is interposed between two structures 1 and 2, its function being to damp or attenuate the transmission of shocks and vibrations from one structure to the other in the axial and radial directions. It comprises a body 3 defined at the end corresponding to the structure 1 by a bottom end wall 4, said body being fixed to the structure 1 by screws such as 5. The body 3 of the damper is closed at its upper end by an upper end wall 6 having a central aperture 7 through which the rod or stem 8 of a piston or plunger 9 extends, said rod being connected to the structure 2 by a fixing plate 10. The assembly comprising the cylindrical body 3, the wall 4 and the wall 6 thus forms a cavity enclosing the piston 9. A membrane 11 composed of a material having a rubber-like elasticity is interposed between the lower face 12 of the piston and the wall 4. The membrane 13, also of a material having a rubber-like elasticity, is interposed between the upper face 14 of the piston and the wall 6. Such a damper operates in the following manner. Under the effect of an increasing compressive load the membrane 11 is progressively compressed until the lower face of this membrane is applied against the wall 4 in the position shown in FIG. 2. Preferably, the conjugate profiles or shapes of the membrane and the lower face 12 of the piston 9 and the upper face of the wall 4 are such that the contact between the membrane and the wall 4 and piston 9 occurs firstly on small areas capable of increasing under the effect of an increase in the force exerted by the piston 9. In the embodiment shown in the FIGS. 1 and 2, the upper membrane 13 is shown secured at its periphery to the body 3 whereas the piston rod 8 is freely slidable in the central aperture 15 formed in this membrane. The advantage of this arrangement is that no tractive deformation of the membrane 13 occurs when a compressive force is applied on the piston 9 by its rod 8. For example, under load, the rigidity of the membrane 11 is solely operative for damping the transmission of vibrations, the opposing membrane 13 only being operative occasionally for elastically limiting the upward movement of the damper when, for example, under the effect of a shock, a sudden tractive force is exerted on the rod 8.

FIG. 3 shows another embodiment in which the carrying membrane 11 is in the shape of a bell, said membrane bearing at its periphery tangentially on the wall 4 so that under the effect of a load bearing downwardly on the rod 8, the elastic deformation of the membrane 11 creates friction between its lower face and the wall 4 and thus absorbs energy, further braking effect being obtained by a suction effect when the membrane 11 is released. In the event that this latter effect is not desired, it suffices to provide the wall 4 with a small orifice 17 so as to put the inner volume defined by the membrane and the wall 4 in communication with the exterior. In the embodiment shown in FIG. 3 the opposing membrane has the shape of a thick part-conical disc which is fixed to the rod 8 and has at its periphery 16 a possibility of frictionally sliding against the bore of the body 3. Further, the piston 9 simply bears by its face 12 on the apex of the carrying membrane 11. The radial displacements said piston could undergo are then not retransmitted to the membrane 11 but create a sliding between these two elements capable of absorbing a certain amount of energy due to friction. On the other hand, the opposing membrane 13 provides an elastic return of the piston to its central position as soon as the latter is displaced therefrom under the effect of an exterior force.

In an arrangement such as that shown in FIGS. 1 and 2 or that shown in FIG. 3, it is possible to vary the elastic characteristics of the damper by varying the pre-stressing of the membranes when assembling. If this pre-stressing is nil each membrane acts independently, one under compressive forces and the other under tractice forces. On the other hand, it is possible when assembling to give to the membranes such shape that they are simultaneously compressed to a certain extent termed the "pre-stressed travel." The two membranes will then act simultaneously in respect of a displacement of the piston which does not exceed the pre-stressed travel and independently in respect of displacements of the piston exceeding said travel.

The general shape of the axial flexibility curve of a damper according to the invention, such as that shown in FIGS. 1 and 2 or that shown in FIG. 3, is represented by a diagram similar to that shown in FIG. 4 in which the axial displacement Z of the piston is plotted as ordinates and the elastic reaction $F_2$ of the damper is plotted as abscissae. The origin O of the co-ordinates corresponds to the position of equilibrium under no load of a piston maintained between two membranes 11 and 13. The position of equilibrium under load is shown by an illustrative point such as C. The flexibility curve comprises two quasi-horizontal asymptotes, one having an ordinate at the origin $+a$ corresponds to the maximum useful depression of the piston 9 obtained when the membrane 11 is completely flattened on the wall 4, and the other having an ordinate $-b$ corresponds to the practical limit to the rise of the piston 9 obtained when the membrane 13 is inserted in the zone located at the periphery of the aperture 7 between the wall 6 and the periphery of the upper face 14 of the piston 9. In this way there is obtained a damper having a variable axial flexibility with a progressive upward and downward abutment effect enabling it to accept considerable momentary overloads either in traction or in compression. Further, it is always possible, in acting on the thickness of the carrying membrane and on the composition of the elastic material of which this membrane is composed, to give the damper a relatively high flexibility in respect of small vibratory displacements about the position C (shown by the tangent $tt$ at C on the curve). To this end, the loaded position C is preferably chosen outside the pre-stressed travel, the carrying membrane then acting alone for the axial return of the piston. Such a damper moreover possesses a certain radial elasticity, the return of the piston rod 8 towards its central position being insured by the thick membrane 13.

FIG. 5 shows a preferred embodiment of the invention having the following features. The membrane 11 has a bell shape and bears at its base on the wall 4 but is different from the embodiment shown in FIG. 3 in that the membrane 11 is extended at its periphery by a skirt 18 which bears on a shoulder 19 formed in the bore of the body 3. The performance of this membrane under compression will be easily understood. Under the effect of the increasing downward pressures exerted by the piston 9, the membrane is flattened against the wall 4 at the same time as the fillet connecting the skirt 18 to the central bell-shaped part tends to apply itself against the fillet 20 connecting the bore of the body 3 to the wall 4, in a position similar to that shown in FIG. 6. Such an arrangement has the advantage of affording a variable flexibility effect which can be greatly modified by means of slight modifications in the shape of the member 11. For example, it is possible to obtain two or three stages of flexibility according as the abutment of the membrane against the fillet 20 is obtained in the course of flattening the membrane or before this flattening. Another important feature of the embodiment shown in FIG. 5 resides in the shape given to the opposing membrane 13 which insures, on the one hand, the axial downward return of the piston rod 8 and, on the other hand, the radial return of said rod.

In order to impart to the opposing membrane great resistance to the forces in the radial and axial (upwardly) directions, which could result from heavy shocks, it has been given the shape of a relatively thick disc, as in the embodiment shown in FIG. 3, which imparts thereto also a relatively high rigidity. In order to recover the desirable flexibility for a suitable filtering of vibrations manifested by radial movements of small amplitude of the piston rod 8 about its central position, a deep annular groove 21 is formed in the membrane 13 in the vicinity of its periphery and a generally conical shape is given to the peripheral face of the disc. The lateral bearing of the membrane 13 on the bore of the body 3 therefore occurs through the medium of a relatively deformable lip 22 which permits obtaining high elasticity in respect of radial displacements of about the width of the slot 21 at its base. The radial elasticity curve of the damper then has the shape shown in FIG. 7. In this diagram the radial displacements are plotted as ordinates and the elastic return forces $Fr$ are plotted as abscissae. Such a curve characterizes a variable elasticity system with high flexibility in the zone $a'a$ on either side of the origin E and decreasing flexibility in respect of larger displacements, thereby creating a progressive abutment effect.

Another particular feature of the device shown in FIG. 5 is the fact that the head of the piston 9 has the shape of a cup whose face bearing against the carrying membrance 11 is concave whereas the face bearing against the opposing membrane 13 is convex. In this way a better seating is achieved on the apex of the membrane 11 and greater progressivity is obtained in the bearing of the piston against the membrane 13.

As it will be understood from the foregoing description, the invention provides shock and vibration dampers affording on effective filtering of the vibrations in both the axial and radial directions while being capable of elastically absorbing or damping the most violent shocks in the axial and radial directions. Further, it is clear from the figures and the description that the dampers according to the invention also constitute swivel joints capable of high flexibility, which is of great advantage in numerous applications. Therefore, the invention provides shock and vibration dampers capable of satisfying the conditions imposed on such apparatus in practice better than known dampers.

It must be understood that the invention is not limited to the embodiments described and that it embraces all other embodiments employing separately or in combination the features mentioned hereinbefore irrespective of the other differences. For example, the body of the apparatus and the piston can have different shapes and can be secured in a different manner. The membranes can also have a shape other than those shown in the accompanying drawing. For the purpose of simplifying the description it was assumed that the damper worked under compression under the effect of a permanent load, but it will be easily understood that it suffices to invert the positions of the carrying membrane and opposing membrane to obtain a damper working under traction under the effect of a permanent load and having the same operational features as those previously described, said damper also being embraced by the scope of the invention. Although the description has been made of apparatus working in the vertical direction, shock and vibration dampers according to the invention can also be employed in any position, for example in an oblique or horizontal position and, particularly in the latter case, they could be subjected to no permanent load.

Having now described my invention what I claim as new and desire to secure by letters patent is:

1. In a shock and vibration damper intended to be interposed between two relatively movable structures and comprising means defining a hollow body for connecting to one of said structures and having a longitudinal axis and a first cylindrical end portion including a first inwardly extending transverse wall portion and a second cylindrical end portion including a second inwardly extending transverse wall portion, a plunger for connecting to the other of said structures and having a stem and a head co-axial with and axially movable in said body, a first membrane interposed between said head and said first wall portion, a second membrane interposed between said head and said second wall portion and encompassing said stem, said membranes being composed of a rubber-like material, said head having a face coacting with said first membrane in damper operation, the first membrane being substantially dome-shaped in the region thereof which lies under the head face defined by the vertical projection onto the first membrane of the periphery of the head face, the dome-shaped region being convergent toward said head face and in contact with the center of said head face, and the first membrane having a substantially constant thickness throughout the diametral extent thereof and a periphery which radially abuts said first end portion and axially abuts said first wall portion when no load is supported by the plunger, whereby when said head face moves toward said first end portion when a load is progressively applied to the plunger in damper operation it progressively deforms the first membrane and comes in contact with said dome-shaped region in a progressively increasing area.

2. A shock and vibration damper as claimed in claim 1, wherein said head face merely abuts the first membrane so as to be freely axially separable from the first membrane in movements of the head face away from said first end portion.

3. A shock and vibration damper as claimed in claim 1, wherein the periphery of the first membrane is unattached to said first end portion and said first wall portion so as to be movable relative thereto in damper operation.

4. A shock and vibration damper as claimed in claim 1, wherein at least one of the membranes has a periphery which is unattached to said body so as to be axially movable in said body in damper operation.

5. In a shock and vibration damper intended to be interposed between two relatively movable structures and comprising means defining a hollow body for connecting to one of said structures and having a longitudinal axis and a first cylindrical end portion including a first inwardly extending transverse wall portion and a second cylindrical end portion including a second inwardly extending transverse wall portion, a plunger for connecting to the other of said structures and having a stem and a head co-axial with and axially movable in said body, a first membrane interposed between said head and said first wall portion, a second membrane interposed between said head and said second wall portion and encompassing said stem, said membranes being composed of a rubber-like material, said head having a face coacting with said first membrane in damper operation, the first membrane being substantially dome-shaped in the region thereof which lies under the head face defined by the vertical projection onto the first membrane of the periphery of the head face, the dome-shaped region being convergent toward said head face and having a center part in contact with said head face, and the first membrane having a thickness in said center part which is greater than the thickness of the rest of the first membrane and having a periphery which radially abuts said first end portion and axially abuts said first wall portion when the damper supports no load, whereby when said head face moves toward said first end portion when a load is progressively applied in damper operation it progressively deforms the first membrane and comes in contact with said dome-shaped region in a progressively increasing area.

6. A shock and vibration damper for insertion between two relatively movable structures, said damper comprising a body for securing to one of said structures and defining a cylindrical cavity having an axis and a first transverse end wall and a second transverse end wall, the second end wall having an aperture on said axis, a piston for securing to the other of said structures and including a rod and a head, the rod extending through said aperture with a radial clearance and the piston being axially movable in the cavity with radial clearance, a first membrane of rubber-like material extending axially between and abutting the piston head and said first end wall, a second annular membrane of rubber-like material interposed between the piston head and said second end wall, the axial extent of said membranes corresponding to the extent they would have in the free uncompressed state thereof so that the first and second membranes are not in a pre-stressed condition, the first membrane radially abutting said cylindrical cavity wall and the second membrane encompassing the rod and having an axial extent at the most equal to the axial distance between the piston head and said second end wall in the uncompressed state of the membranes and a radial extent slightly less than the radial width of the annular space between the rod and the cylindrical cavity wall so as to provide a small clearance and allow a free unhindered axial movement of the piston rod in a direction away from said second end wall, whereby solely the first membrane damps axial movement of the piston towards said first end wall and solely the second membrane damps axial movement of the piston towards said second end wall and radial movement of the piston.

7. A shock and vibration damper for insertion between two relatively movable structures, said damper comprising a body for securing to one of said structures and defining a cylindrical cavity having an axis and a first transverse end wall and a second transverse end wall, the second end wall having an aperture on said axis, a piston for securing to the other of said structures and including a rod and a head, the rod extending through said aperture with a radial clearance and the piston being axially movable in the cavity with radial clearance, a first membrane of rubber-like material extending axially between the piston head and said first end wall, a second annular membrane of rubber-like material interposed between the piston head and said second end wall, the axial extent of said membranes corresponding to the extent they would have in the free uncompressed state thereof so that the membranes are not in a pre-stressed condition, the first membrane radially abutting said cylindrical cavity and axially abutting said first end wall and the second membrane encompassing the rod and having an axial extent at the most equal to the axial distance between the piston head and said second end wall in the uncompressed state of the membranes and a radial extent slightly less than the radial width of the annular space between the rod and the cylindrical cavity so as to provide a small clearance and allow a free unhindered axial movement of the piston rod relative to said cavity in a direction away from said second end wall, whereby solely the first membrane damps axial movements of the piston towards said first end wall and solely the second membrane damps axial movement of the piston towards said second end wall, said head having a face coacting with the first membrane in damper operation, and the first membrane having a substantially cup-shaped center portion which has a generally convex face having a part thereof in contact with a portion of said head face on said axis, said convex face extending radially outwardly from said part of the convex face and axially away from said head face.

8. A shock and vibration damper as claimed in claim 7, wherein the first membrane is unattached to said head so as to be freely separable from said head in damper operation.

9. A shock and vibration damper as claimed in claim 7, wherein the second membrane is in the form of an axially thick disc.

10. A shock and vibration damper for insertion between two relatively movable structures, said damper comprising a body for securing to one of said structures and defining a cylindrical cavity having an axis and a first transverse end wall and a second transverse end wall, the second end wall having an aperture on said axis, a piston for securing to the other of said structures and including a rod and a head, the rod extending through said aperture with a radial clearance and the piston being axially movable in the cavity with radial clearance, a first membrane of rubber-like material extending axially between the piston head and said first end wall, a second annular membrane of rubber-like material interposed between the piston head and said second end wall, the axial extent of said membranes corresponding to the extent they would have in the free uncompressed state thereof so that the membranes are not in a pre-stressed condition, the first membrane radially abutting said cylindrical cavity wall and axially abutting said first end wall and the second membrane encompassing the rod and having an axial extent at the most equal to the axial distance between the piston head and said second end wall in the uncompressed state of the membranes and a radial extent slightly less than the radial width of the annular space between the rod and the cylindrical cavity wall so as to provide a small clearance and allow a free unhindered axial movement of the piston rod relative to said cavity in a direction away from said second end wall, whereby solely the first membrane damps axial movements of the piston towards said first end wall and solely the second membrane damps axial movement of the piston towards said second end wall, said head having a face coacting with the first membrane in damper operation, the first membrane having a substantially cup-shaped center portion which has a generally convex face having a part thereof in contact with a portion of said head face on said axis, said convex face extending radially outwardly from said part of the convex face and axially away from said head face, the second membrane is in the form of an axially thick disc and a circular groove is provided in the vicinity of the periphery of the disc so as to render the peripheral portion of the disc more yieldable in the radial direction.

11. A shock and vibration damper as claimed in claim 9, wherein the disc has a conical peripheral face.

12. In a shock and vibration damper intended to be interposed between two relatively movable structures and comprising means defining a cylindrical cavity for connecting to one of said structures, said cavity having a longitudinal axis and a first transverse end portion and a second transverse end portion, a plunger for connecting to the other of said structures and having a stem and a head coaxial with and axially movable in said cavity, a first membrane interposed between said head and said first end portion and a second membrane interposed between said head and said second end portion and encompassing said stem, the membranes being composed of a rubber-like material, the head having a face capable of coacting with the first membrane in operation of the damper, the first membrane having a substantially cup-shaped center portion which has a generally convex face having a part thereof in contact with a portion of said head face on said axis, said convex face extending radially outwardly from said part of the convex face and axially away from said head face, and the first membrane having a periphery radially abutting said cylindrical cavity defining means and axially abutting said first end portion, whereby when the plunger moves toward said first end portion in damper operation it both deforms the first membrane and comes into contact with the first membrane in a progressively increasing area.

13. A shock and vibration damper as claimed in claim 12, wherein the head of the plunger is secured to said part of the center portion of the first membrane.

14. A shock and vibration damper as claimed in claim 12, wherein the periphery of at least one of the membranes is secured to the means defining said cavity.

15. A shock and vibration damper as claimed in claim 12, wherein the first membrane has the shape of a bell having a peripheral annular portion extending radially outwardly in a direction substantially parallel with the first transverse end portion.

16. A shock and vibration damper as claimed in claim 12, wherein the first membrane has the shape of a bell which is radially extended by an annular skirt portion imparting a substantially W-shaped diametral section to the first membrane.

17. In a shock and vibration damper intended to be interposed between two relatively movable structures and comprising means defining a cylindrical cavity for connecting to one of said structures, said cavity having a longitudinal axis and a first transverse end portion and a second transverse end portion, a plunger for connecting to the other of said structures and having a stem and a head coaxial with and axially movable in said cavity, a first membrane interposed between said head and said first end portion and a second membrane interposed between said head and said second end portion and encompassing said stem, the membranes being composed of a rubber-like material, the head having a face capable of coacting with the first membrane in operation of the damper, the first membrane having the shape of a bell which is radially extended by an annular skirt portion imparting a substantially W-shaped diametral section to the first membrane, the first membrane including a substantially cup-shaped center portion which has a generally convex face having a part thereof in contact with a portion of said head face on said axis, said convex face extending radially outwardly from said part of the convex face and axially away from said head face, the first membrane having a periphery radially abutting said cylindrical cavity defining means and axially abutting said first end portion, whereby when the plunger moves toward said first end portion in damper operation it both deforms the first membrane and comes into contact with the first membrane in a progressively increasing area, and an annular radiused fillet provided on the cylindrical cavity defining means between said first and second end portions for supporting the skirt portion when the plunger axially compresses the first membrane.

18. A shock and vibration damper as claimed in claim 12, wherein said face of the head is concave and the head is convex on the part thereof adjacent the second membrane, the concavity of the head face being less than the convexity of said convex face of the first membrane.

19. A shock and vibration damper as claimed in claim 12, wherein the two membranes are in a pre-stressed condition in said cavity.

20. In a shock and vibration damper intended to be interposed between two relatively movable structures and comprising means defining a cylindrical cavity for connecting to one of said structures, said cavity having a longitudinal axis and a first transverse end portion and a second transverse end portion, a plunger for connecting to the other of said structures and having a stem and a head coaxial with and axially movable in said cavity, a first membrane interposed between said head and said first end portion and a second membrane interposed between said head and said second end portion and encompassing said stem, the membranes being composed of a rubber-like material, the head having a face capable of coacting with the first membrane in operation of the damper, at least the first membrane of said two membranes having a substantially cup-shaped center portion abutting said head, the center portion of the first membrane having a generally convex face having a part thereof in contact with a portion of said head face on said axis, said convex face extending radially outwardly from said part of the convex face and axially away from said head face, and the first membrane having a periphery radially abutting said cylindrical cavity defining means and axially abutting said first end portion, whereby when the plunger moves toward said first end portion in damper operation it both deforms the first membrane and comes into contact with the first membrane in a progressively increasing area, said portion of the head face constituting a minor part of the head face, the radial extent of the head face being equal to the major part of the radial extent of the first membrane, and the thickness of the first membrane in said part thereof in contact with the head face being greater than in the rest of the first membrane.

References Cited by the Examiner

UNITED STATES PATENTS

| | | | |
|---|---|---|---|
| 1,772,414 | 8/1930 | Brooke | 248—9 X |
| 2,172,706 | 9/1939 | Julien | 248—5 |
| 2,367,826 | 1/1945 | Kubaugh | 248—358 |
| 2,377,492 | 6/1945 | Gorton | 248—5 |
| 2,385,759 | 9/1945 | Henshaw | 248—5 |
| 2,841,388 | 7/1958 | Hehn | 248—358.1 X |
| 2,917,265 | 12/1959 | Markowski | 248—358 |

CLAUDE A. LE ROY, *Primary Examiner.*